Aug. 14, 1928.
L. N. CRICHTON ET AL
1,680,410
RELAY TRIPPING SYSTEM
Filed May 24, 1921
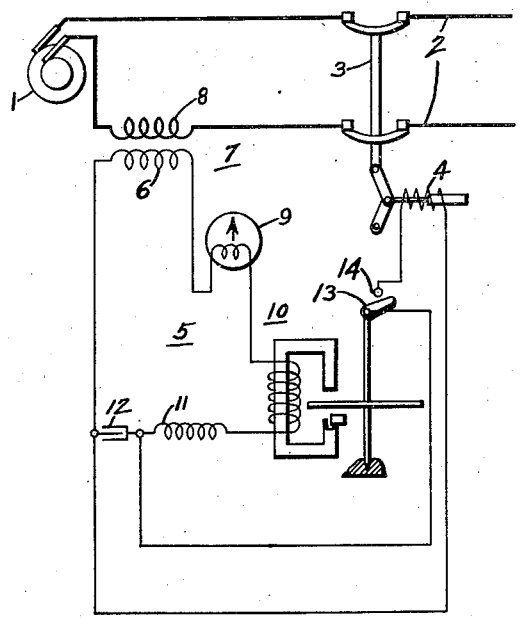
INVENTOR
Leslie N. Crichton &
Lawrence R. Golladay
BY
ATTORNEY Patented Aug. 14, 1928.

1,680,410

UNITED STATES PATENT OFFICE.

LESLIE N. CRICHTON, OF EDGEWOOD, AND LAWRENCE R. GOLLADAY, OF WILKINSBURG, PENNSYLVANIA, ASSIGNORS TO WESTINGHOUSE ELECTRIC AND MANUFACTURING COMPANY, A CORPORATION OF PENNSYLVANIA.

RELAY-TRIPPING SYSTEM.

Application filed May 24, 1921. Serial No. 472,151.

Our invention relates to relay tripping systems and particularly to systems that derive their tripping energy from the circuit to be protected.

One object of our invention is to provide a relay-tripping system for a circuit interrupter that shall derive energy from a circuit to energize the trip coil of the interrupter only upon the occurrence of predetermined abnormal conditions.

Another object of our invention is to provide a relay system, of the above-indicated character, that shall co-operate with a current transformer, energized from the circuit to be protected, in such manner that normally no load will be placed upon the current transformer but energy will be derived therefrom to energize a trip coil only upon the occurrence of predetermined abnormal conditions.

Another object of our invention is to provide a relay tripping system, of the above-indicated character, that shall embody a resonant circuit whereby normally no load will be placed upon the current transformer until the predetermined abnormal conditions occur, whereupon the trip coil will be connected to an element of the resonant circuit in such manner as to be energized from the current transformer.

A further object of our invention is to provide a relay tripping system of the above-indicated character that shall be simple in arrangement and effective in its operation.

In systems heretofore employed for deriving tripping energy from a current transformer to be protected, various devices have been employed to control the connection of a trip coil to the current transformer upon the occurrence of predetermined abnormal conditions. Such devices have been so disposed as to be continuously energized, and a load was thus always placed upon the current transformer.

In view of that condition, a system embodying our invention comprises a resonant circuit including a current transformer, a condensive reactor and an inductive reactor. Although the potential difference across the terminals of either reactor might be relatively large, the load on the current transformer and, consequently, the potential difference thereacross would be relatively small.

By arranging the overload relay to connect the trip coil of a circuit interrupter across the terminals of either reactor upon the occurrence of predetermined abnormal conditions, effective protection of the circuit may be obtained, and actuating energy for the interrupter may be derived from the circuit to be protected without placing a continuous load upon the current transformer. In such a system, the elimination of the load placed upon the current transformer by the controlling devices would render measuring instruments connected to the current transformer more accuate by reason of the lesser load on the transformer.

The accompanying drawing is a diagrammatic view of a relay tripping system embodying our invention.

Referring to the drawing, a source 1 of electromotive force supplies energy to a circuit 2 through a circuit interrupter 3. Upon the occurrence of abnormal conditions in the circuit 2, such as extreme overload or short-circuit, the interrupter 3 is adapted to be actuated by a tripping mechanism 4, the energization of which is controlled by a relay tripping system 5.

The relay system 5 comprises the secondary winding 6 of a current transformer 7, the primary winding 8 of which is connected in the main circuit. The secondary winding 6 of the current transformer is connected in circuit with the winding of an electrical instrument 9, the winding of a relay 10, an inductive reactor 11 and a condensive reactor 12.

The relay 10 is preferably of the induction disc type embodying an inverse time-element and, when energized to a predetermined degree, is adapted to effect the engagement of a pair of contact members 13 and 14.

The instrument 9 and the relay 10 serve to increase the value of inductive reactance of the relay system, and, if desired, may be arranged to constitute the entire inductive reactance.

The reactive elements 9, 10, 11 and 12 are so arranged with respect to the current transformer and the other elements included in circuit therewith that the circuit normally is rendered resonant. Upon the occurrence of such abnormal conditions in the load circuit 2 as suffice to effect the engagement of the contact members 13 and 14, the trip coil 4 is connected across the condensive reactor 12, whereupon the resonant condition of the circuit is disturbed and sufficient energy is thereupon derived from the main circuit, through the current transformer 7, to energize the trip coil 4.

It will be observed that, until the resonant condition is disturbed by the connection of the trip coil across the terminals of the condensive reactor 12, no load is placed upon the current transformer except by the measuring instrument 9 and the relay 10. In the system illustrated, the inductive reactance of the instrument 9 and of the relay 10 contribute to the inductive reactance of the resonant circuit.

It will thus be observed that substantially no load is normally placed upon the current transformer by auxiliary control devices which are employed to provide a potential difference for energizing the trip coil, but only upon the occurrence of predetermined abnormal conditions, such as overloads of predetermined values, or short-circuits will a large load be placed upon the current transformer.

It is understood that various other arrangements of the elements described and illustrated may be made within the spirit and scope of the invention, as set forth in the appended claim.

We claim as our invention:

In an electric circuit, the combination with a circuit-interrupter provided with a trip coil controlling said circuit, of a current transformer connected in said circuit, a relay, a winding for said relay and a condenser connected in series with the secondary winding of said transformer, said series circuit being resonant at the normal frequency, and means whereby said relay connects the trip coil of said circuit-interrupter in shunt to said condenser upon the occurrence of abnormal conditions in said circuit to interrupt the same.

In testimony whereof, we have hereunto subscribed our names this 11th day of May, 1921.

LESLIE N. CRICHTON.
LAWRENCE R. GOLLADAY.